United States Patent
Wise (10) Patent No.: US 10,237,763 B1
(45) Date of Patent: Mar. 19, 2019

(54) REAL TIME DATA METER

(71) Applicant: GLOBAL EAGLE ENTERTAINMENT INC., Seattle, WA (US)

(72) Inventor: Robert M Wise, Issaquah, WA (US)

(73) Assignee: Global Eagle Entertainment Inc., Los Angeles, CA (US)

( * ) Notice: Subject to any disclaimer, the term of this patent is extended or adjusted under 35 U.S.C. 154(b) by 724 days.

(21) Appl. No.: 13/969,614

(22) Filed: Aug. 19, 2013

Related U.S. Application Data (60) Provisional application No. 61/684,730, filed on Aug. 18, 2012.

(51) Int. Cl.
*H04W 24/04* (2009.01)
*H04L 12/26* (2006.01)

(52) U.S. Cl.
CPC ......... *H04W 24/04* (2013.01); *H04L 43/0852* (2013.01)

(58) Field of Classification Search
CPC .................. H04L 43/0852; H04L 43/0858
USPC .......................................................... 709/217
See application file for complete search history.

(56) References Cited

U.S. PATENT DOCUMENTS

| | | | | |
|---|---|---|---|---|
| 6,374,336 B1* | 4/2002 | Peters | ................. | G06F 11/1076 348/E5.008 |
| 2002/0133473 A1* | 9/2002 | Grande | .............. | G06Q 30/0284 705/418 |
| 2002/0178070 A1* | 11/2002 | Leveridge | ............... | G06Q 20/02 705/26.35 |
| 2010/0107054 A1* | 4/2010 | Park | .................... | G06F 3/04842 715/234 |
| 2010/0188990 A1* | 7/2010 | Raleigh | ............ | G06Q 10/06375 370/252 |
| 2011/0296053 A1* | 12/2011 | Medved | ................ | H04L 67/104 709/241 |
| 2011/0314091 A1* | 12/2011 | Podjarny | ........... | G06F 17/30905 709/203 |
| 2012/0030305 A1* | 2/2012 | Marquess | ......... | G06F 17/30861 709/213 |
| 2013/0006806 A1* | 1/2013 | German | .................. | H04L 67/14 705/26.8 |
| 2013/0086247 A1* | 4/2013 | Burckart | ............. | H04L 67/2823 709/224 |

* cited by examiner

*Primary Examiner* — Jason D Recek
(74) *Attorney, Agent, or Firm* — SoCal IP Law Group LLP; Jonathan Pearce; Steven C. Sereboff (57) ABSTRACT

A system includes a wireless interface to a central computer system that communicates with multiple mobile communication platforms (MCPs), and logic to receive a request for content from a device aboard a first MCP, the content not stored on the first MCP, the device having an associated data plan. The system includes logic to communicate the request for content to the central computer system, and to receive from the central computer system an indication of a time delay before the content will be available to the device on a non-priority basis, and logic to notify the device of the time delay, and to provide the device with an indication of an impact that receiving the content on a priority basis will have on the data plan."

20 Claims, 8 Drawing Sheets

REAL TIME DATA METER

PRIORITY

This application claims priority under 35 U.S.C. 119 to application no. U.S. 61/684,730, filed on Aug. 18, 2012, which is incorporated herein by reference in its entirety.

BACKGROUND

Satellites provide a mechanism for transmitting data from terrestrial locations to other terrestrial locations. Satellites are useful when transmit distances are long, so that 'line of sight' transmission is impractical, and when the use of wireline data transmission is unavailable. Satellite data transmission is wireless and consequently subject to interference from terrestrial weather and electromagnetic emission. Bandwidth for satellite transmission is also expensive relative to other forms of data communication.

BRIEF DESCRIPTION OF THE DRAWINGS

In the drawings, the same reference numbers and acronyms identify elements or acts with the same or similar functionality for ease of understanding and convenience. To easily identify the discussion of any particular element or act, the most significant digit or digits in a reference number refer to the figure number in which that element is first introduced.

DETAILED DESCRIPTION

Preliminaries

References to "one embodiment" or "an embodiment" do not necessarily refer to the same embodiment, although they may. Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively, unless expressly limited to a single one or multiple ones. Additionally, the words "herein," "above," "below" and words of similar import, when used in this application, refer to this application as a whole and not to any particular portions of this application. When the claims use the word "or" in reference to a list of two or more items, that word covers all of the following interpretations of the word: any of the items in the list, all of the items in the list and any combination of the items in the list, unless expressly limited to one or the other.

Definitions

"Logic" refers to machine memory circuits, machine readable media, and/or circuitry which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic.

Those skilled in the art will appreciate that logic may be distributed throughout one or more devices, and/or may be comprised of combinations memory, media, processing circuits and controllers, other circuits, and so on. Therefore, in the interest of clarity and correctness logic may not always be distinctly illustrated in drawings of devices and systems, although it is inherently present therein.

The techniques and procedures described herein may be implemented via logic distributed in one or more computing devices. The particular distribution and choice of logic may vary according to implementation.

The following terminology and acronyms may be used in the description which follows:

CIR: Committed Information Rate—the guaranteed minimum amount of bandwidth committed to a customer, application or remote site MIR: Maximum Information Rate—the maximum amount of bandwidth allocated to a customer, application or remote site based on availability and not guaranteed Bandwidth Pool: A specific segment of bandwidth that is typically shared between multiple customers, sites or ships in a region.

VSAT: Very Small Aperture Terminal Wireless: includes WIFI, LTE, WIMAX, 3G, 4G and any other wireless communications technologies.

CBM: Central Bandwidth Manager—located in a central data center

LSS: Local Service Selector—located on individual vessels, remote sites or vehicles NMS: Network Management System MCP: Mobile Communications Platform (includes ships, vehicles and aircraft)

Shore side: Refers to any fixed (non-mobile) location in the area of an MCP.

Backhaul (back-haul): bandwidth available between a shore-side antenna and backbone networks of the Internet.

Spatial diversity: A measure of overlap between antennae pairings between antennae of an MCP and shore-side antennae. Fewer overlaps equates to higher spatial diversity. Spatial diversity may also include a measure of spatial separation between shore-side antennae or the communication channels of shore-side and MCP paired antennae.

Shore-side antenna: An antenna that is not on a moving vessel; a fixed-location antenna.

Application: Logic that executes as one or more processes of a device operating system.

Real-time: Events or actions that take place in close temporal proximity to their cause or stimulus.

Predictive coupling: An antenna pairing decision made prior to actual communication contact between the antennas.

Port: In the context of an MCP location, refers to a location where an MCP can dock/park and where passengers can typically disembark.

Bandwidth allocation: Reservation of bandwidth resources on a communication channel.

WiFi (Wi-Fi): Wi-Fi is the name of a popular wireless networking technology that uses radio waves to provide wireless high-speed Internet and network connections. A common misconception is that the term Wi-Fi is short for "wireless fidelity," however this is not the case. Wi-Fi is simply a trademarked term meaning IEEE 802.11x. The Wi-Fi Alliance, the organization that owns the Wi-Fi (registered trademark) term specifically defines Wi-Fi as any "wireless local area network (WLAN) products that are based on the Institute of Electrical and Electronics Engineers' (IEEE) 802.11 standards." Initially, Wi-Fi was used in place of only the 2.4 GHz 802.11b standard, however the Wi-Fi Alliance has expanded the generic use of the Wi-Fi term to include any type of network or WLAN product based on any of the 802.11 standards, including 802.11b, 802.11a, dual-band, and so on, in an attempt to stop confusion about wireless LAN interoperability.

Description

A content aggregator is a computer system with a large volume of mass storage. The selection of content to aggregate is based on human activity on the MCP while the MCP is limited to a low bandwidth connection. For example requests for music, video, or large files may be made using URLs and so forth from mobile devices or computer systems on a cruise ship while it is at sea, limited to a low-bandwidth satellite connection to the Internet.

Rather than attempting to fulfill these requests back to the MCP immediately, the requests may instead be cached on the LSS of the MCP. When a first MCP comes within a range of a directed hi-bandwidth beam provided from a "port", e.g. a fixed bandwidth service and/or content aggregator location (e.g., a shaped WiFi beam from a ship dock), or within beam range of a second MCP, the requested content (that which is not already cached by the LSS of the first MCP) may be directed from the port or LSS of the second MCP to the LSS of the first MCP.

In one embodiment, when content is requested that isn't cached by the LSS, the LSS communicates with the CBM to determine one or more ports or other MCPs that cache or will cache the content. The CBM applies route, timing, and other factors to determine a time interval when the requested content will be available in a port content aggregator or the LSS of a second MCP that will be within range of a directed hi-bandwidth link of the first MCP, and reports this time interval to the requesting device. Optionally, the LSS may also provide the requesting device with an option to obtain the content sooner, for example by prioritizing the content request on the satellite connection, for a payment.

The LSS comprises logic to track and capture content (e.g., webpage) requests from devices on the MCP, and to then download the content to the LSS at an appropriate time via a directed high-bandwidth link, and to communicate it to the requesting devices at a time when the link to the first MCP to a port or second MCP has sufficient bandwidth. The aggregated content may be loaded onto the LSS and stored there once the high speed link is established. The content is then available to other MCPs which may pass within a range of a directed high speed wireless data link of the first MCP. This creates a roaming distributed content aggregator, in which content requests from devices on multiple MCPs may be aggregated at ports, and an MCP approaching or leaving the port becoming a node of the distributed aggregator from which other MCPs can pull content using a directed wireless beam. Thus, the coordinates, headings, speeds, ranges, and other information about each MCP in a content aggregation zone may be applied to establish a roaming distributed content aggregation system, so that requests from a first MCP which is far from any port may be directed to a content aggregator at port, and content placed on a second MCP that is approaching, at, or leaving the port so that the content is physically carried to within a range of the first MCP and the content then transmitted between the MCPs.

In one embodiment, the time reported for availability of content not cached in an LSS may be determined according to satellite bandwidth available to the MCP comprising the LSS, and/or time until the MCP comes within directed beam range of a port or other MCP that caches the content. A person requesting the content may be advised of a time before the content is available, and provided an option to purchase priority on the low-bandwidth satellite uplink from the MCP, to get the content sooner.

In one embodiment, the time that is reported for when the content will be available depends, at least in part, on how much satellite bandwidth from a fixed bandwidth pool is allocated to the MCP. This allocation may be varied dynamically according to how many content requests are pending, and/or the estimated time to obtain the requested content, and/or whether or how many priority bandwidth purchases are submitted for the MCP.

Data Meter

A data meter may be displayed on or near a web page or an element of the web page (e.g., a link, a video, a sound icon) and indicates the data usage impact of user actions on the web page. For example, a "mouse over" event on a displayed web page element may display the usage impact to a data plan of a person browsing the web page, if they click on the web page element. The usage data information may be precompiled by the LSS or CBM and inserted as Javascript or HTML into the web page before the web page is displayed. The data usage meter may be removed/suppressed when the user enters an area where non-metered access to the network is available. In other words, the data usage meter may be selectively displayed/enabled depending on the user's network access environment and circumstances.

Network users on limited data plans often don't realize the impact that an action will have on their data allotment. The data meter provides them pre-knowledge of said impact so that they can better decide which actions are worth taking. In one embodiment, time availability information (as described above) about the content is provided along with the data usage impact information.

In one embodiment, the LSS intercepts web page or content requests from a user device on the MCP. The caching server checks its local cache for the web page and/or content referenced by the web page, and checks that the cached version of the content/page is up to date. If so, the web page is provided back to the user device and includes modifications to the web page code to indicate data usage impact for actions that may be taken on the page, such as clicking different links/elements, playing videos, playing music, sounds, and so on. If the web page is not cached, the LSS may request the web page and content from the CBM or directly from the server hosting the web page/content, and modify it with usage data, then provide it in response to the request. In some embodiments, only the usage data is cached, and the web page is retrieved and modified in response to user device requests.

In one embodiment, usage data for elements on a web page is collected and stored by the CBM. The LSS requests said data in response to an access request by a device on the MCP. The web page is provided to the device, with the usage data for some elements inserted into the web page code, as received by the LSS from the CBM in response to the web page request by the device.

The LSS may cache the modified web pages and/or usage data separately, or retrieves the usage data for cached web pages from the CBM. In general, the web pages and/or data usage impact data for the elements of web pages may be stored by CBM, LSS, the original content host, or combinations of these.

Uplink Sharing, Channel Bonding, and Dynamic Re-Provisioning of Satellite Pool Bandwidth Satellite channels used by multiple MCPs may be shared between the MCPs while they are within a range of one another using a high speed directed wireless data connection. Requests for satellite bandwidth from devices on one of the MCPs may be redirected to the satellite channel of another MCP across the high speed data link. MCPs' location and their headings may be identified using the satellite data link itself rather than GPS or another technique.

Capacity utilization of each MCP satellite channel is monitored and load balancing of channel traffic of each MCP is coordinated between the MCPs. Channel bonding may take place in some circumstances where all the bandwidth needed for a particular operation is unavailable on any one channel.

If channel bonding takes place, it may be done from the satellite modem(s) of one of the plurality of proximate MCPs. Effectively, the single MCP chosen to provide the uplink for all the MCPs may be allocated all of the uplink bandwidth for the MCPs. A shared satellite pool of bandwidth may then be reconfigured to account for the single MCP providing all of the uplink bandwidth for the MCPs (refer to the following description).

A pool of satellite bandwidth is allocated among MCPs based upon the connectivity circumstances of the MCPs. The connectivity circumstances of a particular MCP may include whether it has access to an alternate connection to the network (e.g., port WiFi), its location, whether it is proximate to another MCP that provides uplink bandwidth, whether it has just arrived to port or will soon depart, predicted weather patterns, passenger count and other considerations, such as:

Bandwidth cost
Link performance and availability
Link latency
MCP itinerary or course
Bandwidth availability
Customer preferences
Network load balance A pool of satellite bandwidth shared among all MCPs in a group of MCPS may be allocated according to the connectivity circumstances of one or more particular MCPs or applications and services within MCPs, and/or a statistical model derived from circumstances of multiple MCPs in the group. Other factors for determining an MCPs allocation of the satellite bandwidth pool include how many/what types (e.g., how large) content requests are pending on an MCP, how long before those content requests can be fulfilled using a directed high-bandwidth beam, and/or how many premium bandwidth purchases are submitted by people on the MCP.

MCPs may be grouped according to factors including MCP ownership, MCP type, geographic location, occupancy, bandwidth demands (which may be a function of connectivity plan purchases by the MCP's occupants), routes, connectivity circumstances, application requirements, and various other technical, environmental and commercial factors.

Figure 1:
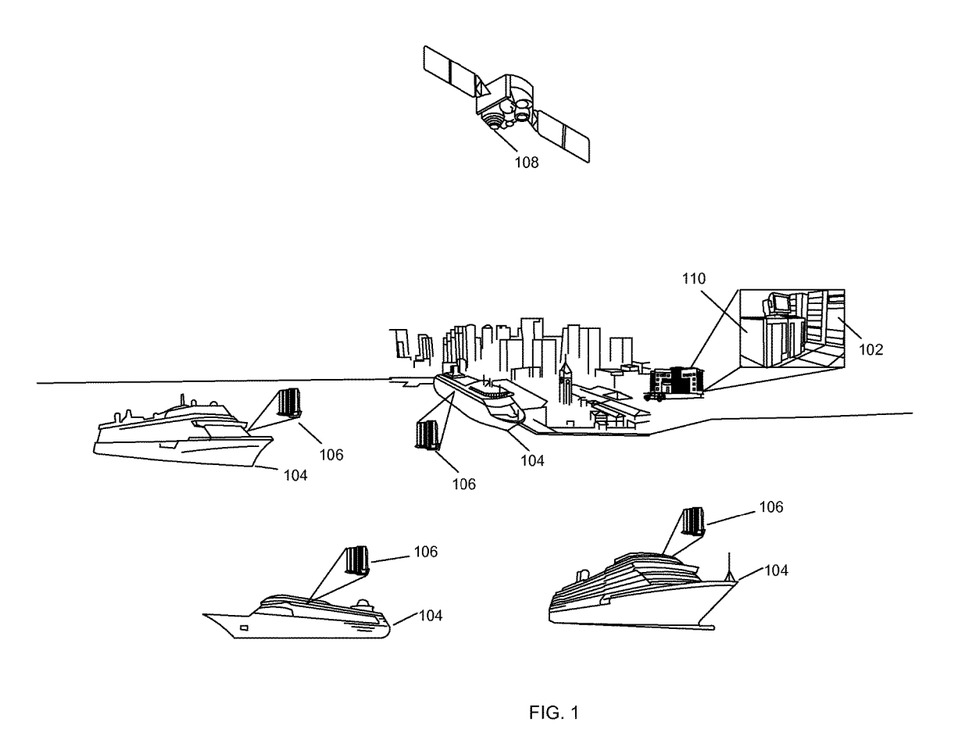
FIG. 1 illustrates a communication environment embodiment including multiple mobile communication platforms communicating via a shared satellite bandwidth pool.

Referring to FIG. 1, bandwidth allocation for satellite 108 communications is managed and controlled by two independent but cooperating systems. They are:

1) Central Bandwidth Manager (CBM) 102
2) Local Service Selectors (LSS) 106 that are mobile and located on each MCP 104

The CBM 102 is responsible for the overall monitoring and control of the bandwidth allocation process. The CBM 102 interfaces with various Network Management Systems 110 (like the iDirect NMS), to obtain real-time bandwidth allocation and utilization data at the network, MCP 104 and application levels. The CBM 102 also interfaces with the LSSs 106 on each MCP 104 to determine the status of the connectivity options available to each MCP. The LSS 106 is responsible for making local routing decisions based on real-time connectivity circumstances as well as pre-set rules and thresholds. The LSSs 106 routing decisions can also be driven by commands from the CBM 102. Once a routing decision is made and executed, the CBM 102 instructs the relevant NMS 110 to reallocate the bandwidth across the remaining MCPs 104.

Example

Figure 2:
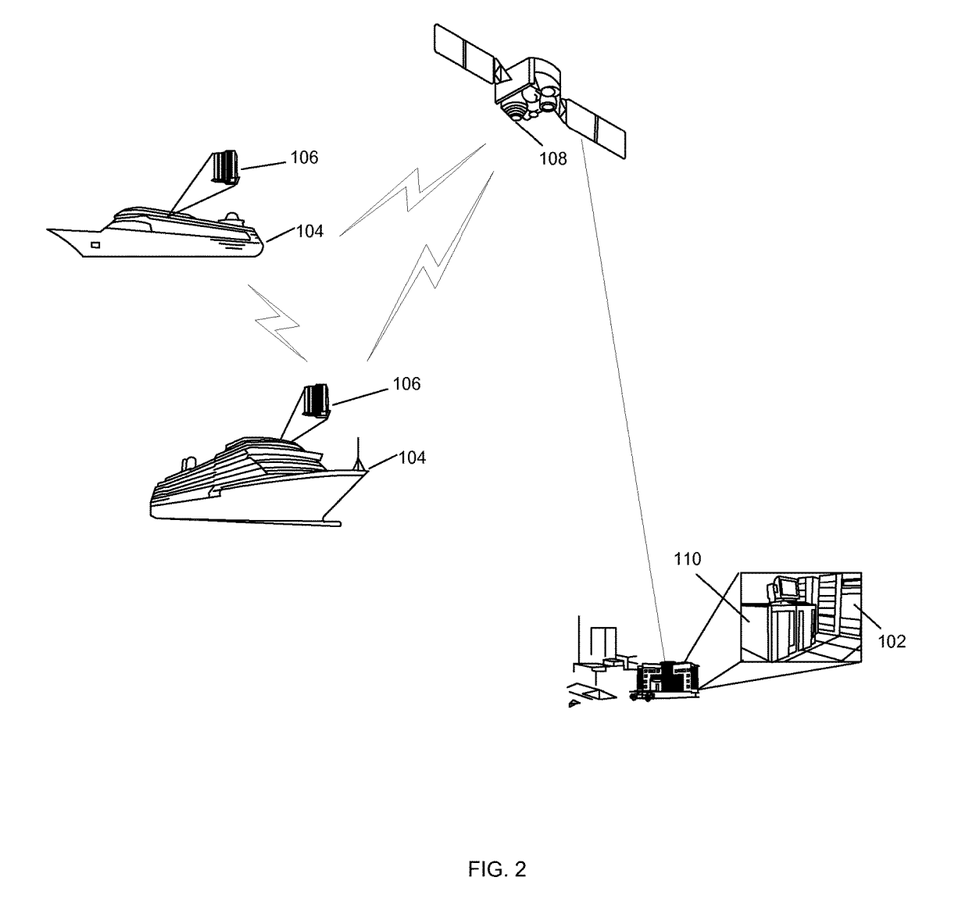
FIG. 2 illustrates a communication environment embodiment including multiple mobile communication platforms communicating via a shared satellite uplink.

Referring to FIG. 2, each of two cruise ships belonging to a common cruise line is allocated between 1 Mb of a 10 Mbps pool of bandwidth on a specific satellite covering the Caribbean region. All of the ships are equipped with VSAT and long range WIFI antennas. Several ports along the itinerary of the vessels are equipped with WIFI base stations. Each vessel is allocated a 1 Mbps CR, burstable to a 3 Mbps MIR, within the 10 Mbps pool.

Ship B is at port, and ship A is far at sea. Devices on ship A request content that is not available on the LSS of ship A. The requests are routed via satellite to the LSS of ship B, which downloads the content from the port content aggregator. Ship B then leaves port. As ship "A" enters within WiFi range of ship B, the LSS device onboard ship A requests the missing content from the LSS of ship B. The LSS of ship B provides the content to the LSS of ship A.

Figure 3:
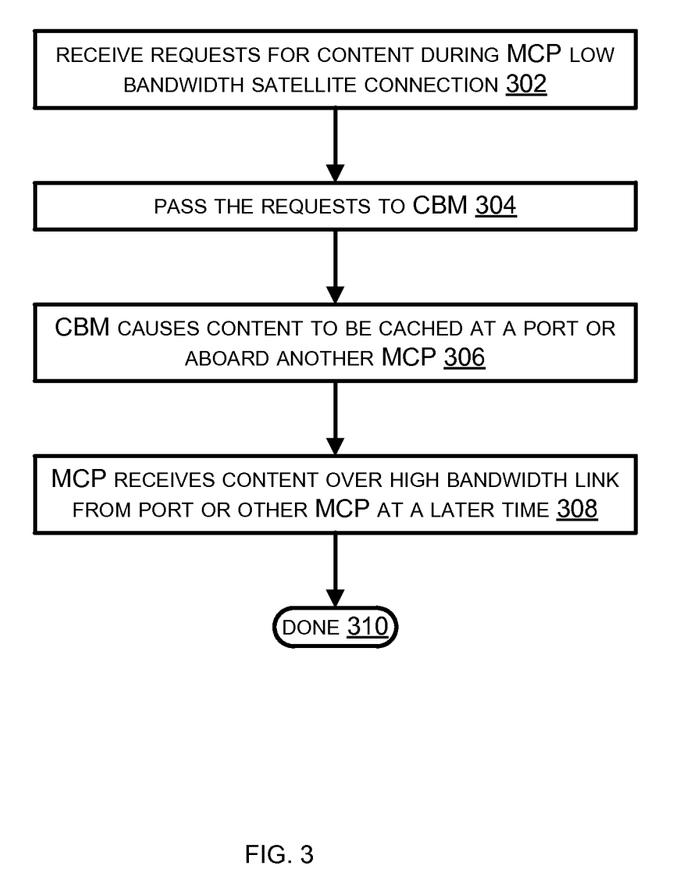
FIGS. 3-5 illustrate example processes for establishing a roaming content aggregation system.
Figure 4:
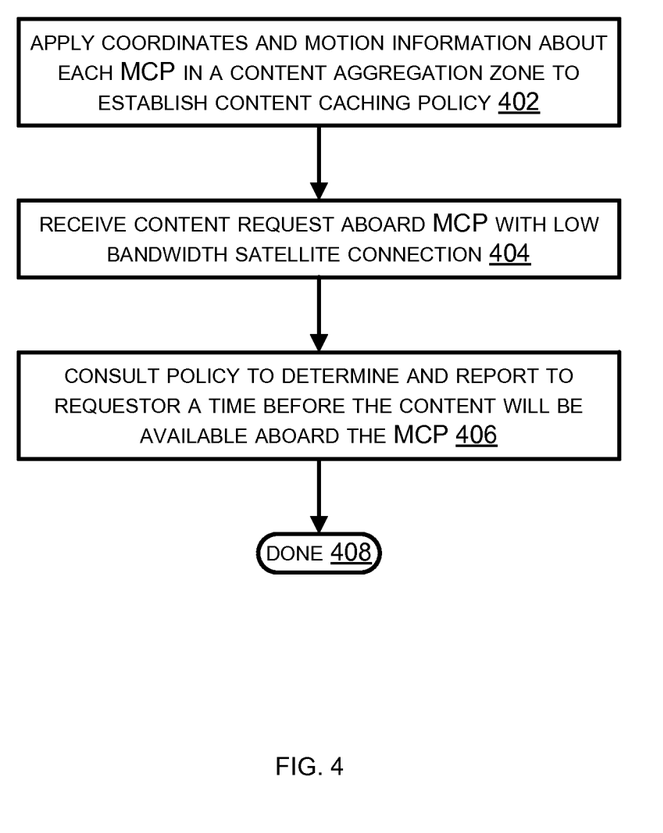
Figure 5:
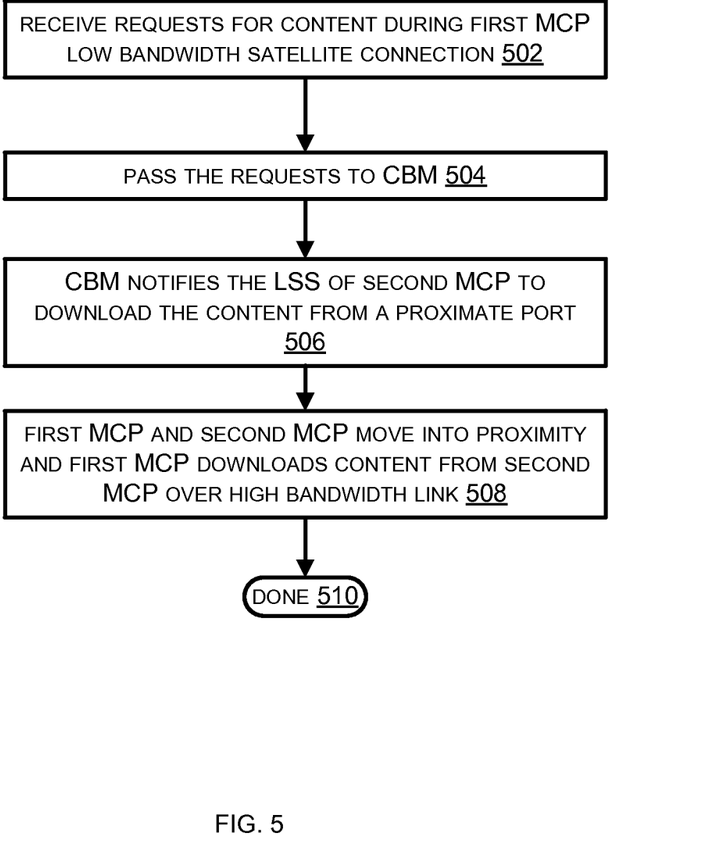

FIGS. 3-5 illustrate example processes for establishing a roaming content aggregation system. Content requests are received from an MCP having only a low-bandwidth satellite connection available (302). These requests are passed via the satellite connection to the CBM (304), which causes the content to be cached at a port or aboard a second MCP proximate to a port and having a high-bandwidth wireless connection to the port (306). The first MCP then downloads the content from the port or the second MCP at a later time of proximity with one or both (308), and concludes (310). The CBM may notify the first MCP of the location of the cached content, or the first MCP may obtain a manifest of cached content from the second MCP or port upon obtaining proximity, or the first MCP may make a request for the content to the second MCP or port upon obtaining proximity. The timing of fulfillment of a content request may also be determined. For instance, the present coordinates of the first MCP, combined with information about its predicted motion in the future, may be applied against a content aggregation zone for the MCP, and a caching policy therefore (e.g., including coordinates and predicted motion of other MCPs, and coordinates of ports in the zone). See 402. When a content request is received by the first MCP (404), the policy and zone may be applied to determine and report to the requesting party a delay before the content will be available (406). This time delay may be reported to the requestor, and a payment by the requestor may be applied to prioritize the content request so that the content is made available sooner, via transfer over the satellite connection. The process then concludes (408). In a variation, content requests are received from an MCP having only a low-bandwidth satellite connection available (502). These requests are passed via the satellite connection to the CBM (504), which notifies the LSS of a second MCP proximate to a port and having a high-bandwidth wireless connection to the port to download the content from or through the port (506). The first MCP then downloads the content from the second MCP at a later time of proximity (508), and the process concludes (510).

Figure 6:
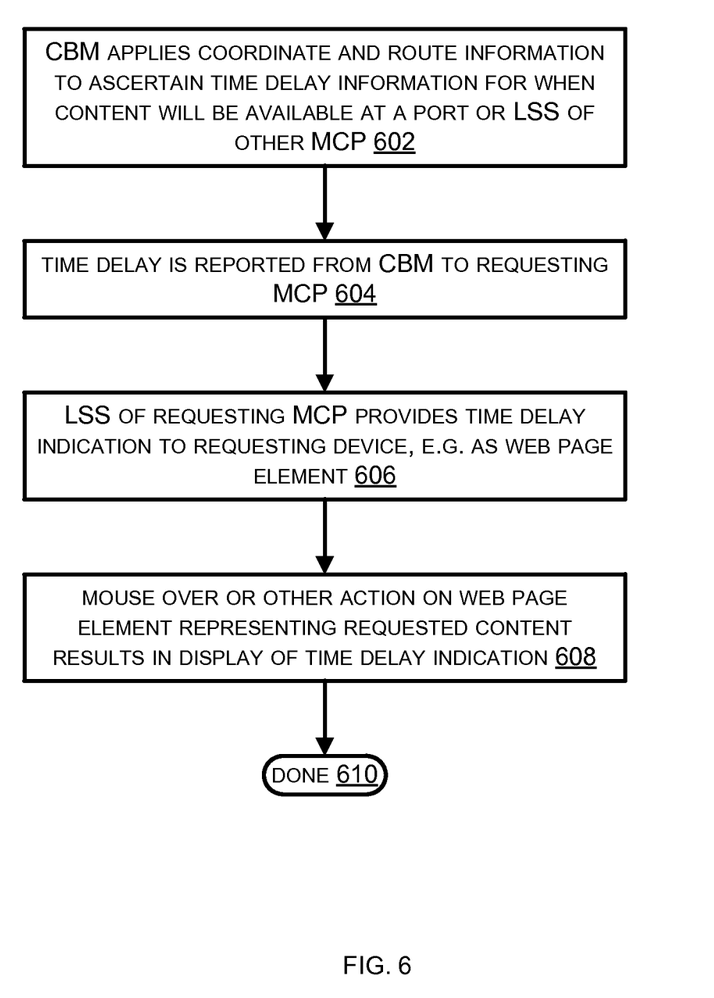
FIG. 6 illustrates an embodiment of a process of displaying a time delay indication for accessing content aboard an MCP.

FIG. 6 illustrates an embodiment of a process of displaying a time delay indication for accessing content aboard an MCP. An LSS may receive a request from an on-board device to access (e.g., download) content from a wide area network extending beyond the MCP, such as the Internet. At 602 the CBM applies coordinate and route information to ascertain a time delay indication for when the content will be available at a port or at the LSS another MCP (other than the one making the content request). At 604 the time delay is communicated from the CBM to the requesting MCP. At 606 the LSS of the requesting MCP communicates the time delay indication to the device aboard the MCP that is requesting the content, e.g. as a web page element. If the indication is not immediately displayed, a mouse over or other action involving a user interface element (e.g., a web page link or icon) results in display of the time delay indication (608). The process concludes (610).

Figure 7:
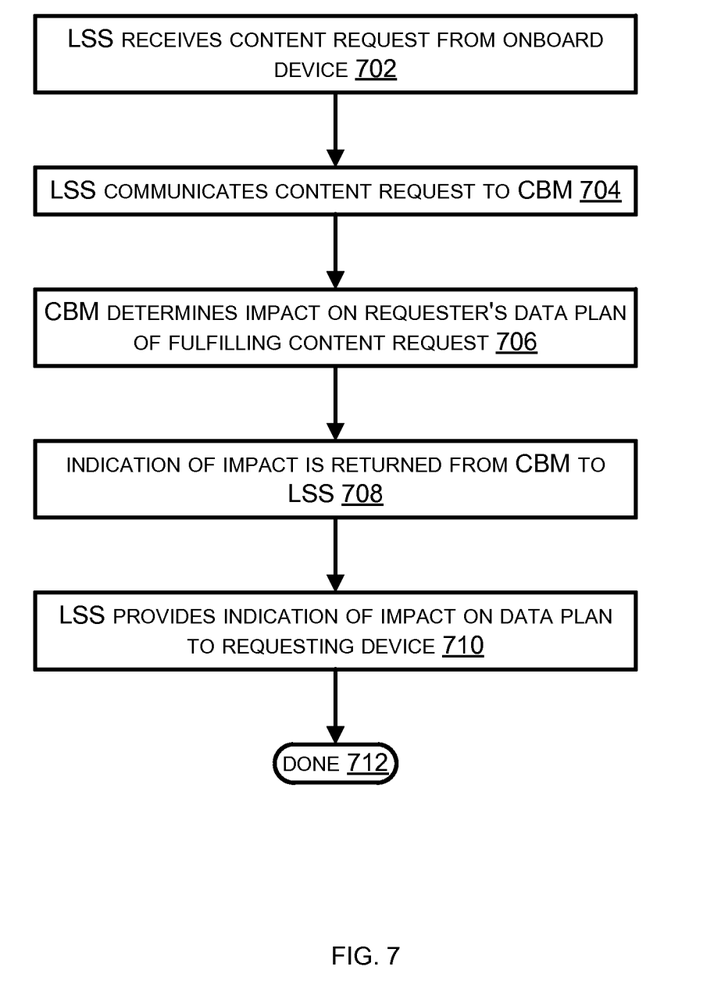
FIG. 7 illustrates an embodiment of a process for displaying a data plan impact indication for accessing content aboard an MCP.

FIG. 7 illustrates an embodiment of a process for displaying a data plan impact indication for accessing content aboard an MCP. At 702 the LSS receives a request to access (e.g., download) content from a wide area network extending beyond the MCP, such as the Internet. The LSS communicates the content request to the CBM (704). The CBM determines an impact that accessing the content request with the device will have on a data plan associated with a user or owner of the device (706). An indication of the impact is communicated from the CBM to the LSS (708). The LSS provides an indication of the impact on the data plan to the requesting device (710), and the process concludes (712).

Figure 8:
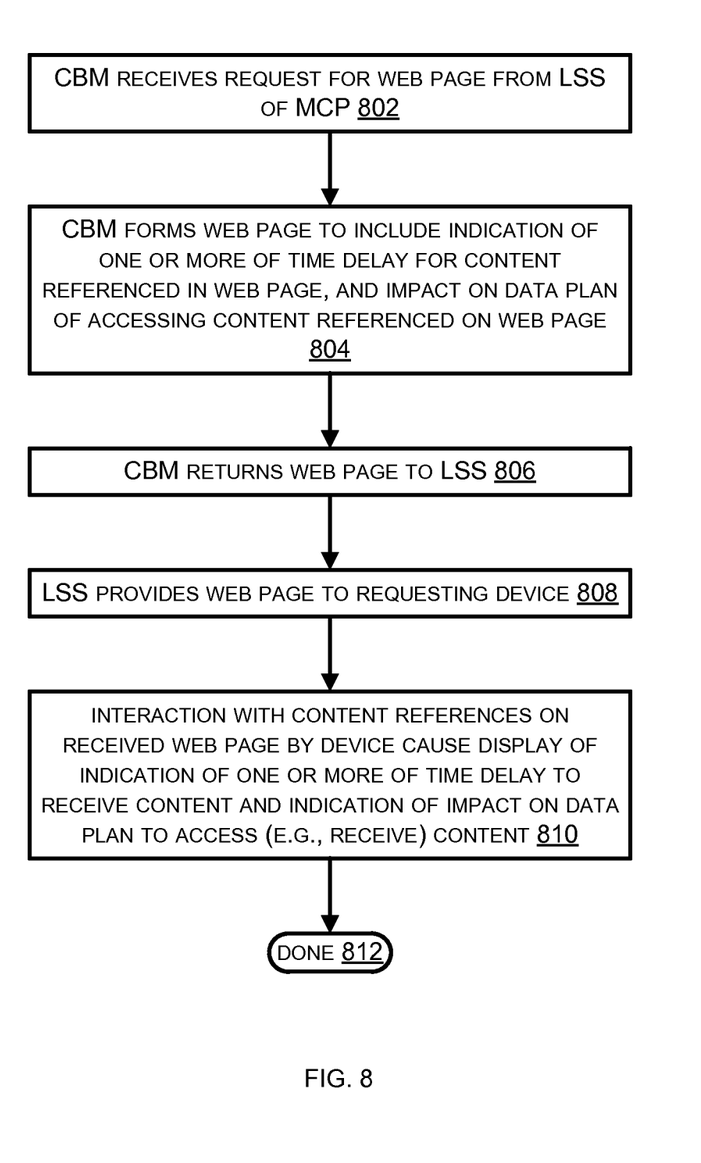
FIG. 8 illustrates an embodiment of a process for modifying web pages requested by a device aboard an MCP.

FIG. 8 illustrates an embodiment of a process for modifying web pages requested by a device aboard an MCP. A CBM receives a request for a web page, the request forwarded from the LSS of an MCP (802). The CBM locates the web page on a Wide Area Network, such as the Internet, and reforms the web page to include one or more of a time delay indication and data plan impact for content that is part of, or is referenced by, the web page (804). The CBM communicates the modified web page to the LSS (806), and the LSS provides the modified web page to the requesting device (808). Interaction with content references on the modified web page by the device cause display of indications of the time delay or data plan impact for the device to access the content (810). The process concludes (812).

In alternate embodiments, the LSS map perform the web page modifications, using indications of delay and/or data plan impact that are stored in an index relating particular content to delays and impacts. The index may be cached by the LSS prior to leaving port, or may be obtained from the CBM. In another embodiment, the LSS receives a web page from the CBM in response to the request, without certain content that would impact the user's data plan. The delay and/or impact indications are then inserted into the received web page by the LSS.

Variations on the general inventive concept illustrated by the above embodiments will now be evident to those having skill in the art.

Implementations and Alternatives

The techniques and procedures described herein may be implemented via logic distributed in one or more computing devices. The particular distribution and choice of logic may vary according to implementation.

Those having skill in the art will appreciate that there are various logic implementations by which processes and/or systems described herein can be effected (e.g., hardware, software, and/or firmware), and that the preferred vehicle will vary with the context in which the processes are deployed. "Software" refers to logic that may be readily readapted to different purposes (e.g. read/write volatile or nonvolatile memory or media). "Firmware" refers to logic embodied as read-only memories and/or media. Hardware refers to logic embodied as analog and/or digital circuits. If an implementer determines that speed and accuracy are paramount, the implementer may opt for a hardware and/or firmware vehicle; alternatively, if flexibility is paramount, the implementer may opt for a solely software implementation; or, yet again alternatively, the implementer may opt for some combination of hardware, software, and/or firmware. Hence, there are several possible vehicles by which the processes described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations may involve optically-oriented hardware, software, and or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood as notorious by those within the art that each function and/or operation within such block diagrams, flowcharts, or examples can be implemented, individually and/or collectively, by a wide range of hardware, software, firmware, or virtually any combination thereof. Several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in standard integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and/or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies equally regardless of the particular type of signal bearing media used to actually carry out the distribution. Examples of a signal bearing media include, but are not limited to, the following: recordable type media such as floppy disks, hard disk drives, CD ROMs, digital tape, and computer memory.

In a general sense, those skilled in the art will recognize that the various aspects described herein which can be implemented, individually and/or collectively, by a wide range of hardware, software, firmware, or any combination thereof can be viewed as being composed of various types of "circuitry." Consequently, as used herein "circuitry" includes, but is not limited to, electrical circuitry having at least one discrete electrical circuit, electrical circuitry having at least one integrated circuit, electrical circuitry having at least one application specific integrated circuit, circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), circuitry forming a memory device (e.g., forms of random access memory), and/or circuitry forming a communications device (e.g., a modem, communications switch, or optical-electrical equipment).

Those skilled in the art will recognize that it is common within the art to describe devices and/or processes in the fashion set forth herein, and thereafter use standard engineering practices to integrate such described devices and/or processes into larger systems. That is, at least a portion of the devices and/or processes described herein can be integrated into a network processing system via a reasonable amount of experimentation.

The foregoing described aspects depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

What is claimed is:

1. A system comprising:
a wireless interface that communicates with multiple oceangoing or airborne mobile communication platforms (MCPs) over a wireless network;
logic, operating on a central computer system comprising a processor and memory, to receive a web page request for a web page available on a first MCP from a device aboard the first MCP;
logic, operating on the central computer system to generate an altered web page including an indication of a time delay before a content accessible via a link on the web page, the content not stored on the first MCP, will be available on a non-priority basis over the wireless network using a connection to a second MCP or a direct connection to a land-based network, and to calculate an indication of an impact that retrieving the content on a priority basis using a satellite uplink will have on an associated data plan;
logic, operating on the central computer system, to communicate the altered web page comprising the link to the content to the device; and
logic, operating on the central computer system, to cause the time delay, and to insert the indication of the impact displayed in proximity to the link on the altered web page, prior to receiving a request for content.

2. The system of claim 1, further comprising:
logic to communicate the request for content and receive the indication of the time delay via the satellite uplink.

3. The system of claim 1, further comprising:
logic to receive the indication of the impact on the associated data plan from the central computer system aboard the first MCP.

4. The system of claim 1, further comprising:
logic to determine the indication of the impact on the associated data plan without receiving it from the central computer system.

5. The system of claim 1, further comprising:
logic to cache the content request from the device and to download the content at a later time when a data link to one or more of the land-based network and a second MCP becomes available to the first MCP.

6. The system of claim 1, further comprising:
logic to modify a second web page comprising the content to cause the second web page, when displayed, to display the indication of the impact to the associated data plan of accessing the content.

7. The system of claim 6, further comprising:
the logic to modify the second web page causing a mouse over event for a web page element for the content to display the indication of the impact on the associated data plan.

8. The system of claim 6, further comprising:
logic to one of suppress or remove the indication of the impact to the associated data plan of data from the second web page when the content is available for access without the impact to the associated data plan.

9. A system comprising:
a central computer system comprising logic to receive a request for content from multiple oceangoing or airborne mobile communication platforms (MCPs) over a wireless network;
a first system aboard a first mobile communication platform (first MCP system) comprising:
a wireless interface to the central computer system via the wireless network;
logic to receive a request from a device aboard the first MCP for a web page, the web page including content accessible via a link on the web page, the content not stored within the first MCP system, the device aboard the first MCP having an associated data plan;
logic to communicate the request to the central computer system and to receive from the central computer system an indication of a time delay before the content will be available to the devices aboard the first MCP on a non-priority basis over the wireless network using a connection to a second MCP or a direct connection to a land-based network, and an indication of an impact that retrieving the content on a priority basis using a satellite uplink will have on the associated data plan; and
logic to provide the device aboard the first MCP with an altered web page including the link and the indication of the of the time delay and the impact proximate to the link.

10. The system of claim 9, further comprising:
the first MCP system comprising logic to communicate the request and receive the indication of the time delay via the satellite uplink.

11. The system of claim 9, further comprising:
the first MCP system comprising logic to receive the indication of impact on the associated data plan from the central computer system aboard the first MCP.

12. The system of claim 9, further comprising:
the first MCP system comprising logic to determine the indication of impact on the data plan without receiving the indication of impact on the associated data plan from the central computer system.

13. The system of claim 9, further comprising:
the first MCP system comprising logic to cache the requests for content from the devices aboard the first MCP system and to download the content at a later time when a data link to one or more of the land-based network and a second MCP system becomes available to the first MCP system.

14. The system of claim 9, further comprising:
the central computer system comprising logic to determine the indication of the time delay based upon coordinate and route information for the MCPs.

15. The system of claim 9, further comprising:
the first MCP system comprising logic to modify a web page comprising the content to cause the web page, when displayed, to display the indication of impact on the associated data plan.

16. The system of claim 15, further comprising:
the logic to modify the web page causing a mouse over event for a web page element for the content to display the indication of impact on the associated data plan.

17. The system of claim 15, further comprising:
the first MCP system comprising logic to one of suppress or remove the indication of impacts on the data plans from the web page when the content is available for access without impact to the associated data plan.

18. The system of claim 9, further comprising:
the central computer system comprising logic to modify a web page comprising the content to cause the web page, when displayed, to display the indication of impacts on the associated data plan of accessing the content, and to return the web page to the first MCP system.

19. The system of claim 9, further comprising:
a second MCP system aboard a second MCP, the second MCP system comprising logic to download the content from a port system; and
the second MCP comprising logic to cooperate with the first MCP system to communicate the content to the first MCP system when the first MCP system and the second MCP system come within range of a directed wireless communication link.

20. A system comprising:
an oceangoing vessel that wirelessly communicates with the internet while relying upon connection with wireless networks available from one or more other oceangoing vessels or by using a satellite uplink;
a network communications server on the oceangoing vessel that receives a web page request for a web page available from a computing device aboard the oceangoing vessel;
logic to generate an altered web page including an indication of a time delay before a content accessible via a link on the web page, the content not stored aboard the oceangoing vessel, will be available on a non-priority basis over a wireless network through a connection to one of the one or more other oceangoing vessels, and to calculate an indication of an impact that retrieving the content on a priority basis using the satellite uplink will have on an associated data plan;
logic to communicate the altered web page comprising the link to the content to the device; and
logic to cause the time delay, and to insert the indication of the impact displayed in proximity to the link on the altered web page, prior to receiving a request for content.

* * * * *